United States Patent
Walsh et al.

(10) Patent No.: US 12,413,585 B2
(45) Date of Patent: Sep. 9, 2025

(54) SYSTEM AND METHOD FOR ELECTRONIC AUTHENTICATION OF ELECTRONIC DISTRIBUTED NETWORK TRAFFIC VIA ENRICHED DATA

(71) Applicant: BANK OF AMERICA CORPORATION, Charlotte, NC (US)

(72) Inventors: Barry Gregory Jude Walsh, Greystones (IE); Tomas M. Castrejon, III, Fort Mill, SC (US); Christopher Stephen Littrell, Dallas, TX (US); Edward Lee Traywick, Bellbrook, OH (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 248 days.

(21) Appl. No.: 18/097,930

(22) Filed: Jan. 17, 2023

(65) Prior Publication Data
US 2024/0244050 A1   Jul. 18, 2024

(51) Int. Cl.
*H04L 41/16* (2022.01)
*H04L 9/40* (2022.01)

(52) U.S. Cl.
CPC .......... *H04L 63/0876* (2013.01); *H04L 41/16* (2013.01); *H04L 63/1425* (2013.01)

(58) Field of Classification Search
CPC . H04L 63/0876; H04L 41/16; H04L 63/1425; H04L 63/08
See application file for complete search history.

(56) References Cited

U.S. PATENT DOCUMENTS

| | | | |
|---|---|---|---|
| 9,432,247 B2 | 8/2016 | Arwe et al. | |
| 9,912,549 B2 | 3/2018 | Rieke | |
| 10,511,637 B2 | 12/2019 | Dicorpo et al. | |
| 10,659,335 B1 | 5/2020 | Morris | |
| 10,791,384 B2 | 9/2020 | Adiletta et al. | |
| 11,252,168 B2 | 2/2022 | Mehta et al. | |
| 11,417,131 B2 | 8/2022 | Malak et al. | |
| 11,444,855 B2 | 9/2022 | Naik et al. | |
| 11,470,110 B2 | 10/2022 | Margel et al. | |
| 12,052,289 B2 * | 7/2024 | Brannon | G06N 20/00 |
| 2008/0312898 A1 | 12/2008 | Cleary et al. | |
| 2011/0296519 A1 | 12/2011 | Ide et al. | |
| 2018/0191767 A1 | 7/2018 | Habib et al. | |
| 2019/0138538 A1 | 5/2019 | Stojanovic et al. | |
| 2019/0182291 A1 | 6/2019 | Doron et al. | |

(Continued)

*Primary Examiner* — Lynn D Feild
*Assistant Examiner* — Vladimir I Gavrilenko
(74) *Attorney, Agent, or Firm* — Moore & Van Allen PLLC; Andrew T. Wood

(57) ABSTRACT

Embodiments of the invention are directed to systems, computer program products, and methods for electronic authentication of electronic distributed network traffic via enriched data. An authorization request is provided from a user of a first endpoint device to send or receive data with a second endpoint device. A request for a first authentication credential to the first endpoint device is transmitted, and an authentication transmission is received by the system. An enhanced authentication engine is initialized, which collects, by a middleware, data flow from an identity database to the enhanced authentication engine. A metadata source is combined with the data flow to form a combined data, which is transmitted to an alert engine.

15 Claims, 7 Drawing Sheets

(56) References Cited

U.S. PATENT DOCUMENTS

2022/0121708 A1     4/2022   Burnett et al.
2022/0329473 A1   10/2022   Faircloth et al.
2023/0171266 A1*   6/2023   Brunner .................. H04L 41/16
                                                           726/23

* cited by examiner

SYSTEM AND METHOD FOR ELECTRONIC AUTHENTICATION OF ELECTRONIC DISTRIBUTED NETWORK TRAFFIC VIA ENRICHED DATA

FIELD OF THE INVENTION

The present invention embraces a system and method of electronic authentication of electronic distributed network traffic via enriched data.

BACKGROUND

Currently, entities transfer data within an electronic network, for example, data transferred from a first endpoint device to a second endpoint device, that requires beforehand that a user, attempting to connect to the network and initiate such data transfer, authenticate their identity (e.g., "log-in"). Accordingly, there are situations where malfeasant actors wish to subvert the traditional authentication methods and attempt access to the electronic network from locations, devices, VPNs, outside of the normal operating conditions found for a given user. Moreover, the data transferred both within and outside the entity must maintain a strict level of security such as to not expose sensitive information to such nefarious actors. Current techniques for authentication are still prone to malfeasance if the data which drives authentication decision-making is incomplete or inaccurate. As a result, the needs of the entity are unmet and thus results in a loss of productivity, added expenses, unexpected delays, or the like. As such, there is a need for a system and method for electronic authentication of electronic distributed network traffic via enriched data.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for electronic authentication of electronic distributed network traffic via enriched data, the invention may include receiving an authorization request from a user of a first endpoint device to send or receive data with a second endpoint device, transmitting a request for a first authentication credential to the first endpoint device, receiving, via an authentication transmission, the first authentication credential from the user on a user interface of the first endpoint device, initializing an enhanced authentication engine by transmitting attributes of the authentication transmission to the enhanced authentication engine, wherein the enhanced authentication engine may be configured to: collect, by a middleware, a second data flow from an identity database to the enhanced authentication engine, the second data flow relating to network traffic passing from the identity database to the enhanced authentication engine, combine into a combined data, by the middleware, a metadata source with the second data flow from the identity database, transmit the combined data to an alert engine, wherein the alert engine is configured to transmit an alert to an authorization device if there is an anomaly in the combined data, and authorize the authorization request if there is no anomaly in the combined data.

In some embodiments, the enhanced authentication engine may be further configured to: initiate a machine learning model of the enhanced authentication engine, wherein the machine learning model is configured to at least one of: (i) receive threat indicators as training data, and (ii) recognize patterns in the combined data, and determine, via the machine learning model, anomalies in the combined data.

In some embodiments, the system, method, or computer program product may also include transmitting a request for a second authentication credential to the first endpoint device if there is an anomaly in the combined data determined by the machine learning model, receiving, via a second authentication transmission, the second authentication credential from the user on the user interface of the first endpoint device, and authorizing the authorization request if the second authentication credential is accepted.

In some embodiments, the enhanced authentication engine may be further configured to: transmit the alert to the authorization device, the alert comprising details of the anomaly, and display the alert on a user interface of the authorization device.

In some embodiments, the first endpoint device may include a geolocation module and a forwarding engine operatively coupled to the middleware.

In some embodiments, the metadata source may include geolocation data of the first endpoint device.

In some embodiments, the alert comprises an input, the input may be configured to: receive a new threat indicator from a supervising user, store the new threat indicator in the identity database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
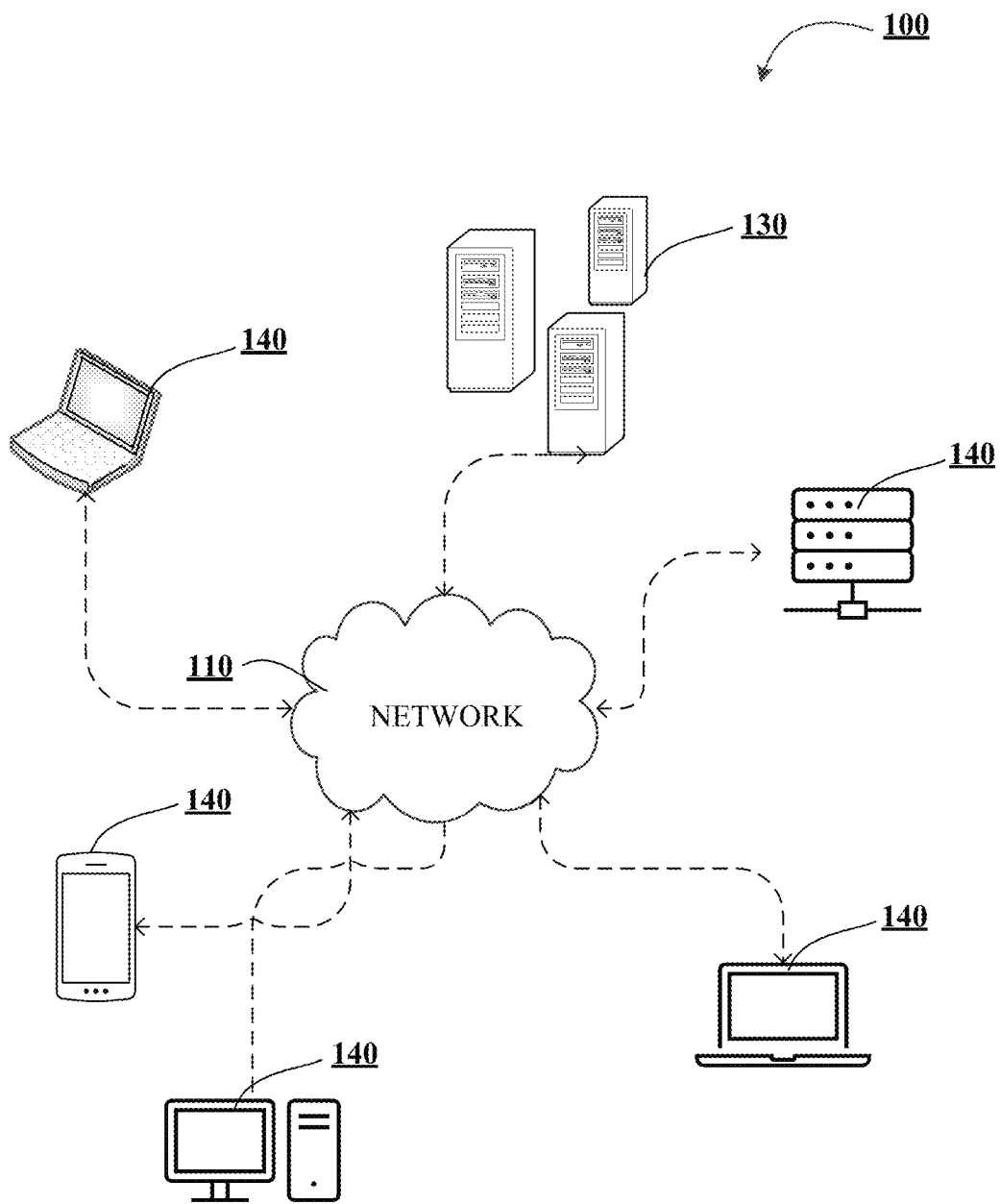
Figure 1B:
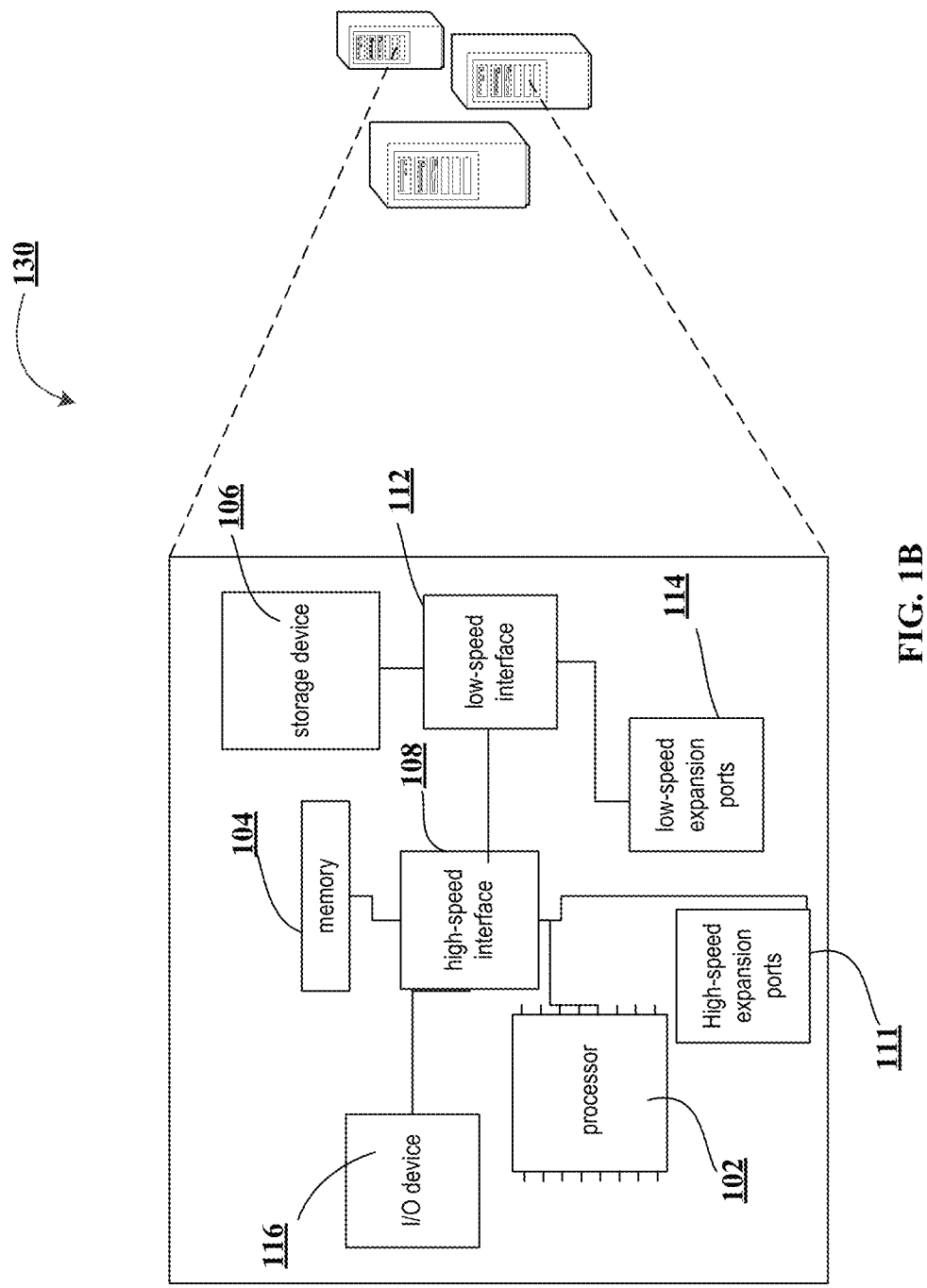
Figure 1C:
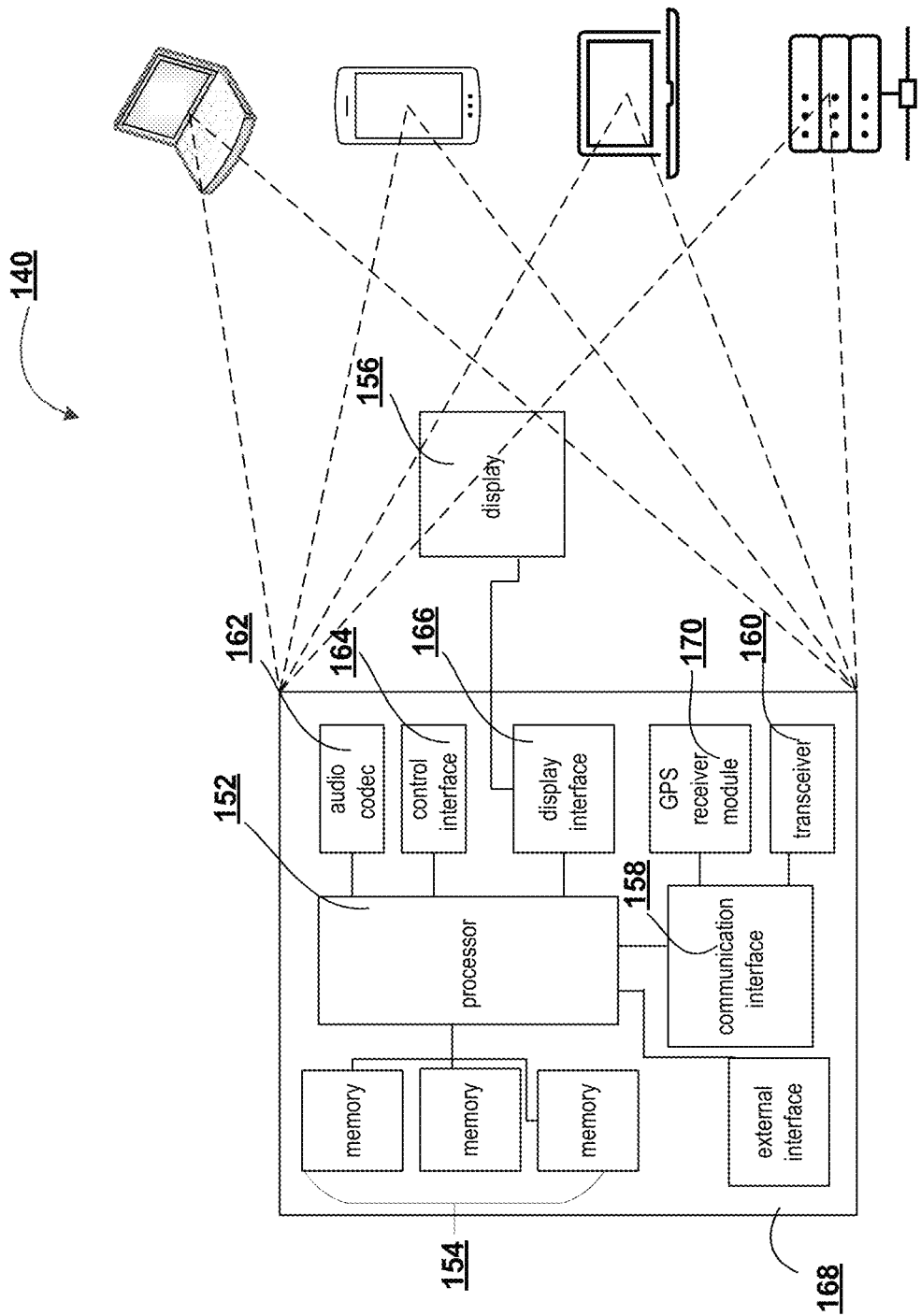
Figure 2:
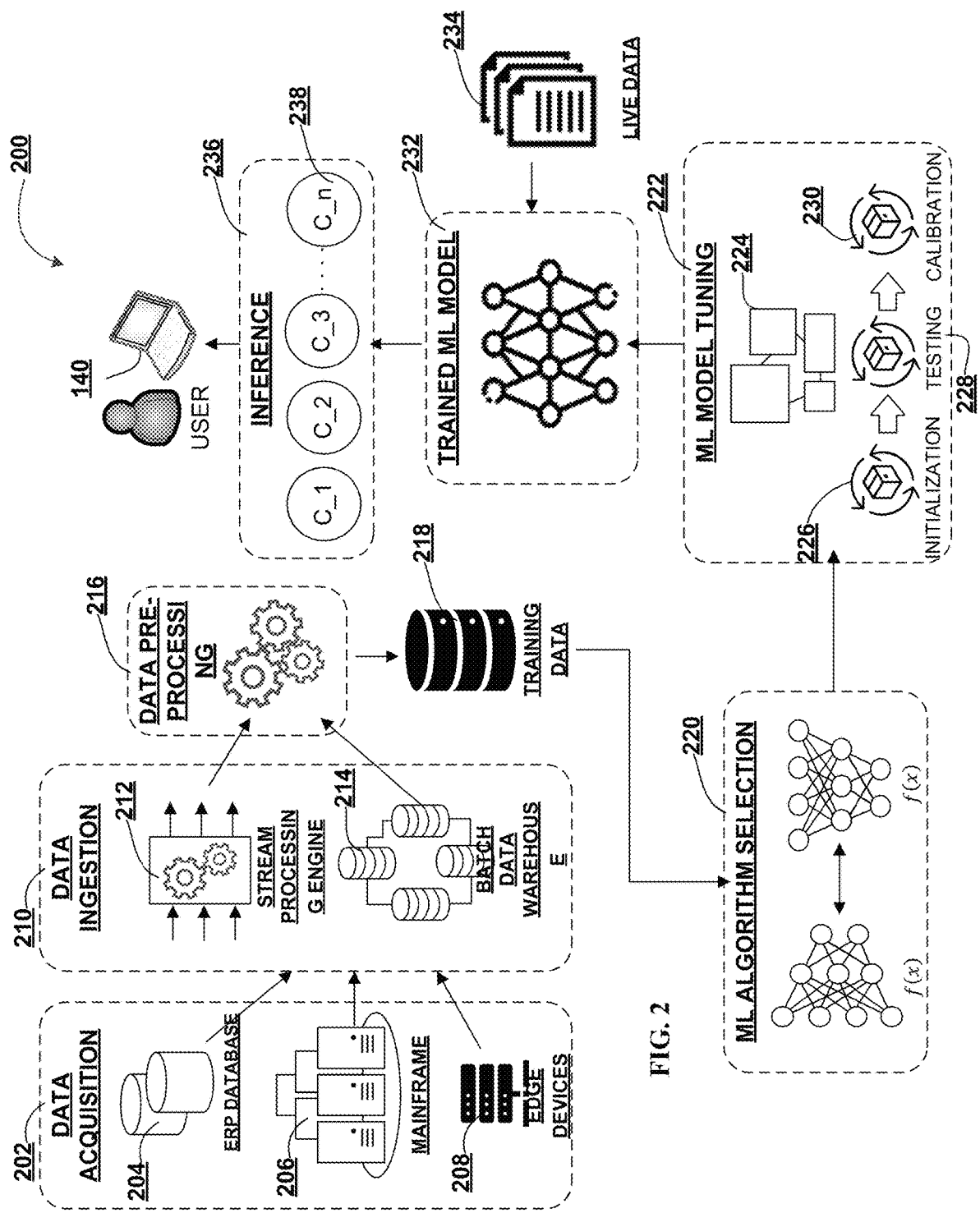
Figure 3:
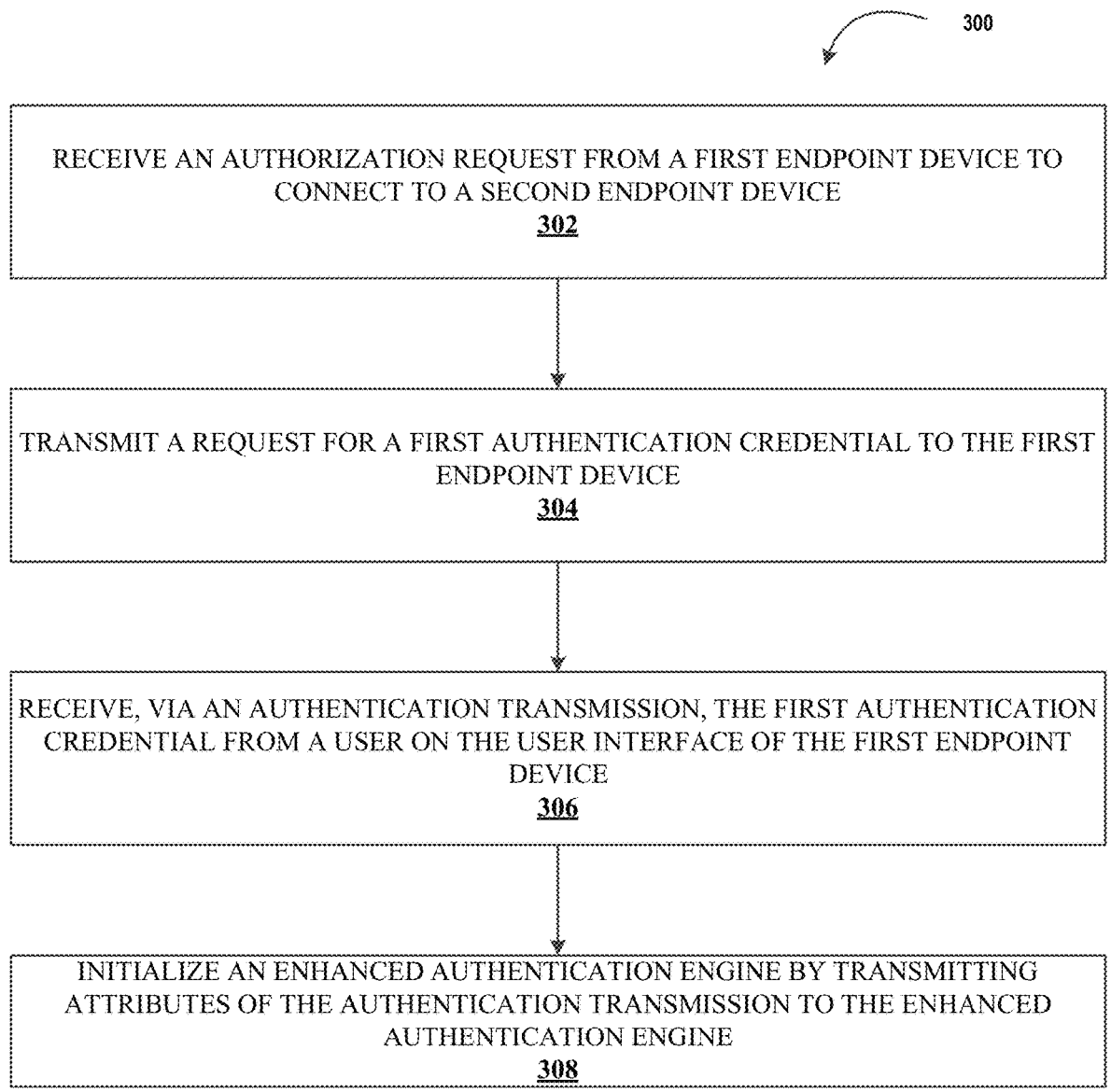
Figure 4:
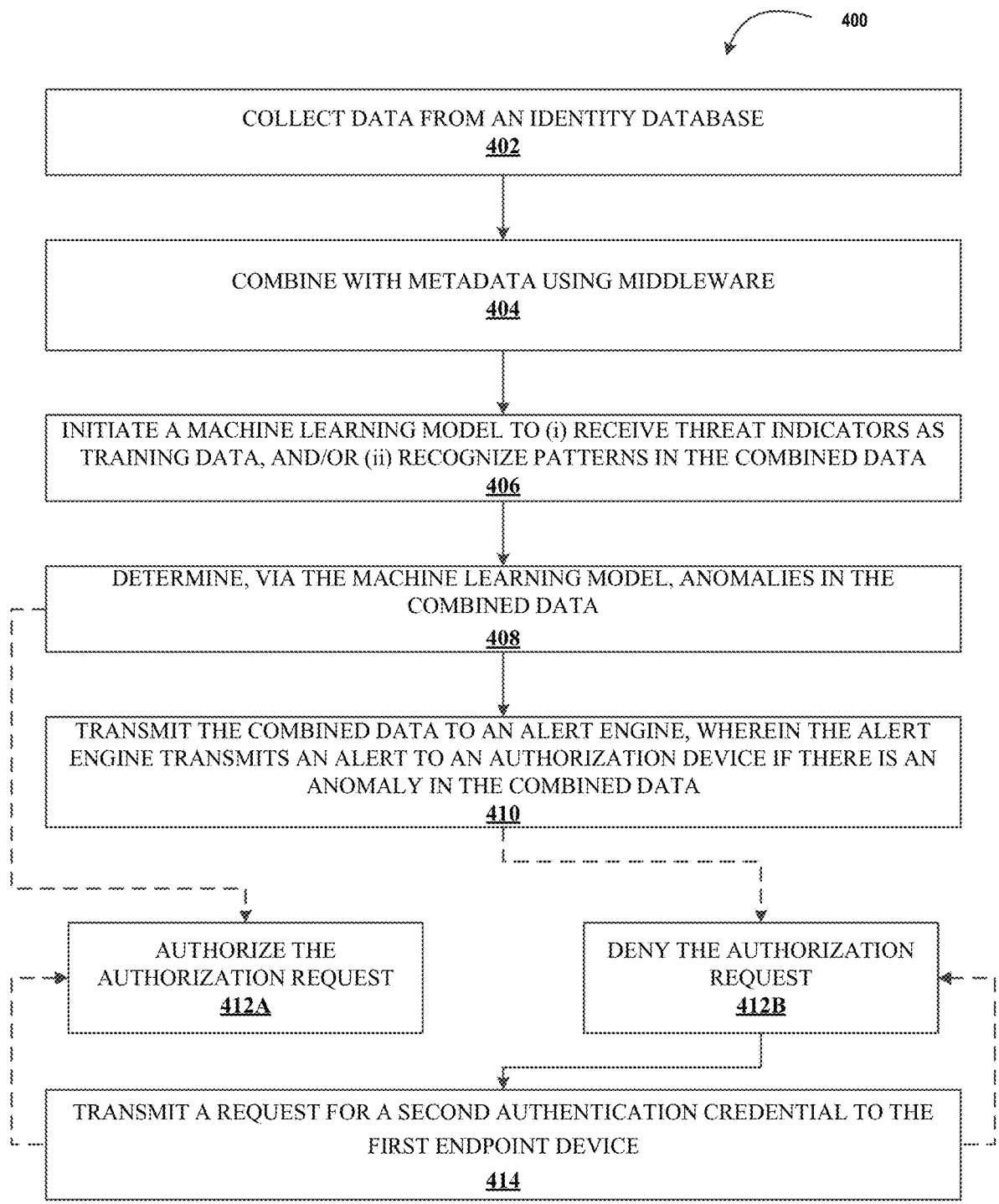
Figure 5:
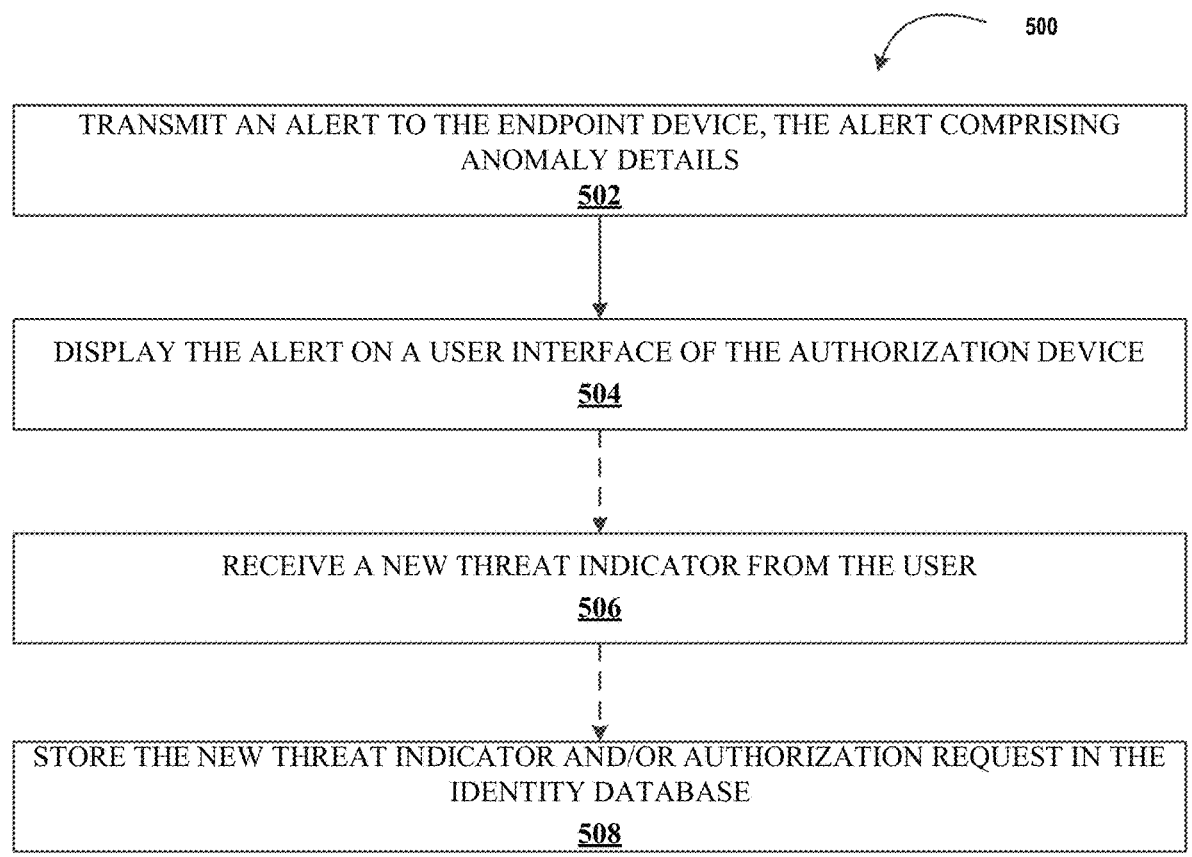

Having thus described embodiments of the invention in general terms, reference will now be made the accompanying drawings, wherein:

FIGS. 1A-1C illustrate technical components of an exemplary distributed computing environment for electronic authentication of electronic distributed network traffic via enriched data, in accordance with an embodiment of the invention;

FIG. 2 illustrates an exemplary machine learning subsystem architecture, in accordance with an embodiment of the invention;

FIG. 3 illustrates a process flow for electronic authentication of electronic distributed network traffic via enriched data, in accordance with an embodiment of the invention;

FIG. 4 illustrates a process flow for an enhanced authentication engine, in accordance with an embodiment of the invention; and FIG. 5 illustrates a process flow for an alert engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as electronic resource transfer or communication data. Typically, these data can be related to the customers of the entity, its products or services, the people who work for the organization, or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "endpoint device" may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The technology described herein implements a middleware component and a machine learning model to enrich entity data with metadata, such as to allow the entity to safeguard against malfeasant actors and better identify anomalies during authentication processes.

Prior to the invention described herein, entities sometimes (i) mistakenly deny network access to users are rightfully attempting to obtain access to the entity network through authentication, and/or (ii) mistakenly allow access to malfeasant users who are wrongfully attempting to obtain access to the entity network. The underlying data used to make such access denial or allowance decisions may be faulty, incorrect, or simply not robust or detailed enough to fully capture the patterns of use of user devices or the creative subversion techniques by malfeasant actors.

The invention disclosed herein provides a system, method, and computer program product for managers of an electronic network which regularly receive data regarding different requests for access privileges for various applications may wish to accurately and efficiently determine where each request originates from, whether each request comprises a misappropriation (e.g., malfeasance) attempt, and other such data regarding each access attempt. The middleware component, and in some embodiments in conjunction with a machine learning model (e.g., a machine learning engine) receives metadata to enrich the entity's data sources in order to assist in automation, detection of misappropriation, and provide alerts with more comprehensive information regarding network malfeasance.

Accordingly, the present disclosure provides for the receiving of an authorization request from a user to connect to the network (e.g., transmit data to and/or from another endpoint device). The system may request a first authentication credential from the first endpoint device. Thereafter, the system may receive a corresponding authentication credential from the user. The receiving of the authentication credential may then initialize an enhanced authentication engine by transmitting attributes of the authentication thereto. Afterwards, a collection may be performed by a middleware component, where a data flow is collected from an identity database to the enhanced authentication engine. The system may combine a metadata source with the data coming from the identity database using the middleware. The metadata source may include geolocation data of device(s). The system may then transmit the combined data to an alert engine. If there are no anomalies, the system may authorize the authorization request. However, if there is an anomaly, the system may request a second authentication credential, which may prompt a user to provide a second authentication credential to be receive by the system. In some embodiments, the system may initiate a machine learning model to: (i) receive threat indicators as training data, and/or (ii) recognize patterns in the combined data; and determine anomalies in the combined data. Thereafter, the system may transmit an alert to the authorization device, the alert including details of the anomaly and an input to receive a new threat indicator from a supervising user. Accordingly, the system may display the alert on a user interface of the authorization device, collect threat indicator information from a user, and store the new threat indicator in the identity database.

What is more, the present invention provides a technical solution to a technical problem. As described herein, the technical problem includes the lack of accuracy and depth of data regarding authorization requests for access privileges to a network, and accordingly an entity may wish to accurately and efficiently determine where each request originates from, whether each request comprises a misappropriation attempt, and other such data regarding each access attempt. The technical solution presented herein allows for the enrichment of data through use of metadata and a middleware component to provide more accurate and in-depth data to entity systems in evaluating authorization requests. In particular, the system is an improvement over existing authorization systems by evaluating authorization requests (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for electronic authentication of electronic distributed network traffic via enriched data, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for electronic authentication of electronic distributed network traffic via enriched data, in accordance with an embodiment of the invention. The process may begin at block 302, where the system 130 receives an authorization request from a user of a first endpoint device 140 to send or receive data with a second endpoint device 140. The system 130 may be structured to provide a log-in dialogue box to the first endpoint device 140, such that a user is able to enter one or more credentials such as a username (e.g., a user identifier) and a password (e.g., an authentication credential). The authentication credential may take numerous embodiments, including but not limited to an alphanumeric sequence of characters, a fingerprint, retinal scan, palm scan, facial scan (e.g., facial recognition) or the like. It shall be appreciated that in some embodiments, a user identifier may not be necessary to provide by the user, such that the system 130 determines both the user identifier and authentication credential by user characteristics such as the fingerprint, retinal scan, palm scan, or facial scan (e.g., facial recognition), the identity of the user stored in a storage device of the system when such user characteristics are presented to the system 130.

At block 304, the system 130 may transmit a request for a first authentication credential to the first endpoint device 140. The system 130 receives the authorization request as illustrated in block 302, and in response the system 130 provides via a transmission to the first endpoint device 140 a request to receive authentication credentials at the first endpoint device 140, from the user. The authentication credentials sought by the system 130 may the password, as previously described, such as an alphanumeric text string, or user characteristics.

Continuing at block 306, the system 130 may receive, via an authentication transmission, the first authentication credential from the user on a user interface of the first endpoint device 140. The user may enter a password or user characteristic (e.g., a first authentication credential) at the first endpoint device 140 by interacting with the graphical user interface via a keyboard, touchscreen keyboard on the graphical user interface, camera, finger, palm, or face scanner apparatus, or the like. Once the user has input the first authentication credential into the first endpoint device 140, the endpoint device 140 may subsequently transmit the first authentication credential to the system 130 via the network.

Upon receiving the first authentication credential via the authentication transmission, in block 308 the system 130 may initialize an enhanced authentication engine by transmitting attributes of the authentication transmission to the enhanced authentication engine. It shall be appreciated that the authentication transmission inherently provides the system 130 with several attributes, namely the internet protocol address ("IP address"), MAC address, TCP stack attributes, browser version, browser cookies, location via global positioning system ("GPS"), operating system of the first endpoint device 140, and so forth.

Accordingly, once the system 130 receives the authentication transmission, the system 130 may activate (e.g., initialize) the enhanced authentication engine within the system 130, such initialization occurring as a result of the system 130 providing to the enhanced authentication engine the attributes of the authentication transmission previously described. For example, the authentication transmission may comprise an IP address, and as such the system 130 may provide the IP address to the enhanced authentication engine. In some embodiments, the enhanced authentication engine may be initialized prior to the enhanced authentication engine receiving the attribute(s) of the authentication transmission. In some embodiments, the enhanced authentication engine may initialize as a result of the system 130 providing the attribute(s) of the authentication transmission to the enhanced authentication engine. The subsequent functionality of the enhanced authentication engine as a result of the activation thereof will be described in detail henceforth with respect to FIG. 4.

Importantly, it shall be understood that while portions of the processes as described herein may refer to the enhanced authentication engine performing such portions, any or all of the described processes attributed herein to the enhanced authentication engine may alternatively be performed by the system 130 in one or more engines distinct from the enhanced authentication engine. Similarly, portions of the processes as described herein may be refer to the system 130 for performing such portions, any or all of the described processes attributed herein to the system 130 may alternatively be performed by the enhanced authorization engine.

FIG. 4 illustrates a process flow 400 for an enhanced authentication engine, in accordance with an embodiment of the invention. After the enhanced authentication engine is initialized, the enhanced authentication engine may collect data from an identity database as illustrated in block 402.

As used herein, an "identity database" may refer to a repository or storage device 106, located either externally to the system 130 of the network 110, or within the system 130 of the network 110, the repository or storage device 106 comprising a database of IP addresses and geolocations of various malfeasant actors, such as individuals, entities, endpoint device(s) 140, countries, or the like which are believed to partake in misappropriation attempts such as by thwarting security measures to obtain authentication to access entity endpoint devices 140 or system(s) 130 under false pretenses. Accordingly, the identity database may contain IP addresses and/or geolocations with which the entity herein wishes to enhance (e.g., enrich) their own internal data to achieve more accurate alert messages and resolution actions related thereto. In some embodiments, the identity database may also contain a database of IP addresses known to be associated with certain virtual private networks ("VPNs") often used by malfeasant actors to obscure true identity of the endpoint device 140.

Such IP addresses and/or geolocations may be essentially "embargoed" such that no user at a user device associated with the IP address and/or geolocation may be capable of completing an authentication request, or "greylisted" such that additional input from the entity may be required prior to allowing a user device associated with the IP address and/or geolocation to complete an authentication request. The identification of embargoed and greylisted IP addresses and/or geolocations may be provided to the identity database by one or more users associated with the entity. Accordingly, the enhanced authentication engine may be operatively coupled to the identity database, to facilitate digital communications therebetween.

After initiation, and as shown in block 402, the enhanced authentication engine may collect, by a middleware, a second data flow from an identity database to the enhanced authentication engine, the second data flow relating to network traffic passing from the identity database to the enhanced authentication engine. As used herein, a "middleware" may refer to any intermediary computer software engine designed to integrate (such as collating or any other assembly of information in a standard order) a data flow, (e.g., the data flow from the identity database and the enhanced authentication engine), with a secondary source of data such as metadata as will be described fully herein with respect to other process steps. Accordingly, the middleware may collect, such as by retrieval of the data at the identity database, or in some embodiments by passively intercepting data flow between the identity database and the enhanced authentication engine under routing data traffic (e.g., flow) conditions.

In some embodiments, the first endpoint device 140 may comprise a geolocation module and a forwarding engine operatively coupled to the middleware. The geolocation module may detect geographic coordinates using a global positioning system, and as such introduce metadata to the first data flow between the first endpoint device 140 and the enhanced authorization engine. In some embodiments, the geolocation module may include a cellular network antenna, the cellular network antenna configured to work in conjunction with the geolocation module to determine the approximate geographic location of the first endpoint device 140 using triangulation between cellar network towers.

The process may continue at block 404, where the middleware of the enhanced authentication engine combines the second data flow (from the identity database) with metadata from a metadata source to form combined data. The middleware will receive the second data flow and metadata from a metadata source, thereafter combining the two data streams into a collated data structure. In some embodiments, the metadata source may be the first endpoint device 140, such that data coupled to metadata is transferred from the first endpoint device 140 through the middleware before it reaches a second endpoint device 140 during an authentication request from the first endpoint device 140 to the second endpoint device 140. The metadata may comprise geographic location data (e.g., geolocation data) of the first endpoint device 140, as determined by a geolocation module of the first endpoint device 140. The geolocation module may be a global positioning system ("GPS") unit, or the geolocation module may determine the approximate location of the first endpoint device 140 through triangulation of cellular network devices to which the first endpoint device 140 may be operatively coupled. The accompanying data, such as GPS coordinates, or a range of GPS coordinates indicating a geographic area to which a first endpoint device 140 may be location, may be used as metadata to accompany the data transmitted during the authorization request.

The process may continue at block 406, wherein the system 130 initiates a machine learning model of the enhanced authentication engine. The machine learning model 224 may be configured to receive threat indicators as training data 218 in order to become a trained machine learning model 232. Threat indicators are parameters set forth by users associated with the entity to identify authorization requests that may be perpetuated by malfeasant actors. Examples include known malicious domains, IP addresses, and/or physical locations, threat types as described by the user, dates of validity of the threat indicator as described by a user, and/or threat type as described by a user (e.g., types of attribution, level of attribution), and so forth. Accordingly, the machine learning model 224 may continuously receive these threat indicators as provided by users associated with the entity, and use the threat indicators as training data to recognize patterns in the combined data.

As such, and as illustrated in block 408, the trained machine learning model 232 may determine anomalies in the combined data by recognizing patterns in the combined data against the threat indicators on which the machine learning model was trained. As previously described, the machine learning model may be subject to supervised learning or unsupervised learning, such that in some embodiments where supervised learning is implemented, a user associated with the entity (e.g., a supervising user) may provide feedback to the machine learning model for the determined (e.g., detected) anomalies prior to the machine learning model definitively determining an anomaly. The supervising user may remove the indication of such anomaly prior to the subsequent process steps disclosed herein.

The process may further continue in block 410, wherein the enhanced authorization engine (or in some embodiments, the machine learning model 224 or trained machine learning model 232) transmits the combined data to an alert engine of the enhanced authorization engine. The alert engine may be an event recording, indexing, searching, and alert program such as Splunk® that is configured to receive, via forwarding engine(s) at the endpoint device level, data to record in a log file or other data input. Forwarding engines are installed on the endpoint device(s) 140 and may collect data from the endpoint device(s). The data may then be pushed to indexers of the alert engine, where the indexers spool and store the data. Accordingly, the alert engine may index such data and divide into individual events, where events are provided timestamp information, host and source information, source type information, or the like. The alert engine may include an interface portion to interact with a user through a graphical user interface of an authorization device such as a computer, mobile device, tablet, server, or the like. In this way, the alert engine may provide a searchable database of events that can be categorized and numerous ways and viewable on a user interface of an authorization device. Moreover, the alert engine may be configured to transmit an alert to an authorization device if there is an anomaly in the combined data as indicated by the machine learning engine and/or a user associated with the entity (e.g., supervising user). The authorization device may be any endpoint device 140 associated with a user associated with the entity (e.g., supervising user), such that the user associated with the entity (e.g., supervising user) may monitor network activity and receive alerts of anomalies thereof, specifically of anomalies in the combined data. An "anomaly" as used herein may refer to any combined data (including the metadata from the first endpoint device 140) which contains a confirmation by the trained machine learning model 232 that the combined data has any commonality with threat indicators received, such as malicious domains, IP addresses, and/or physical locations, threat types as described by the user, dates of validity of the threat indicator as described by a user, and/or threat type as described by a user (e.g., types of attribution, level of attribution), and so forth.

In the event that there are no anomalies in the combined data, as determined by the machine learning engine, the enhanced authorization engine may authorize the authorization request, as illustrated in block 412A. The authorization of the authorization request may result in the connectivity (e.g., the transmission of data) between the first endpoint device 140 and the second endpoint device 140, and/or other system 130.

In some embodiments, the first authentication credential may not have yet been validated by the system 130, and in such embodiments the system 130 may receive the first authentication credential and compare the first authentication credential with an expected value of the first authentication credential stored in a storage device 106 of the system 130. For example, the first authentication credential may be structured as an alphanumeric text string, and the system 130 may compare the first alphanumeric character in the text string of the first authentication credential to the first character in the text string of the first authentication credential that is associated with the user of the first endpoint device 140 (e.g., the expected first authentication credential) stored in the memory device of the system 130. If there is a match between the first character of the first authentication credential and the expected first authentication credential, the system 130 then compares the second characters, third characters, and so forth until each character of the text string of the first authentication credential results in either a match, or a mismatch (e.g., no match) with the expected first authentication credential. Provided there is a match, the system 130 authorizes the authorization request. It shall be appreciated that determination of matching may be accomplished by numerous other routine methods as it pertains not only to strings of alphanumeric text, but also to retinal scans, fingerprint scans, facial recognition, or the like. For example, as it relates to facial recognition, the system 130 may receive a photograph or video (e.g., image) of a human face and compare it to a reference image for a user, where the system 130 adjusts the size of the received image to align the irises of the eyes of the received image to be identical to the reference image (e.g., match the center distance between the two irises as a number of pixels on a user interface). Thereafter, a clustering algorithm may indicate the location of the tip of the nose, mouth, or ears for the received image and compare it to the location of the tip of the nose, mouth or ears for the reference image. A margin of error decided by a user associated with the entity (e.g., supervising user) will allow for a positive match (e.g., authentication) if the distance(s) are within the margin of error of one another.

In other embodiments, the system 30 may receive the first authentication credential and compare the first authentication credential with an expected value of the first authentication credential stored in a storage device 106 of the system 130 before the machine learning model (e.g., the trained machine learning model 232) is initiated in block 406, such as to prevent the unnecessary initiation of the machine learning model if the first authentication credential matches the expected first authentication credential. Thereafter, if there is no match indicated by the system 130, the machine learning model may be initiated as shown in block 406.

In the event that anomalies have been determined to be found by the machine learning model (e.g., the trained machine learning model 232), or if match is not determined using any of the aforementioned methods, the enhanced authentication engine may deny the authorization request as illustrated in block 412B.

If an authorization request is denied, either due to an anomaly in the combined data (e.g., the metadata and the data from the identity database as combined by the middleware) determined by the machine learning model, as illustrated in block 414 the enhanced authentication engine may transmit a request for a second authentication credential to the first endpoint device 140.

The second authentication credential may be a different authentication credential than the first authentication credential, such as to provide an additional layer of security into the authorization request. For example, if the request for the first authorization credential prompted the user to input an alphanumeric password at the first endpoint device 140, the request for the second authentication credential may prompt the user to input a different form of authentication credential (for example, a fingerprint, facial recognition, palm print, retinal scan, etc., instead of another alphanumeric password) to the first endpoint device 140.

In some embodiments, the second authorization credential may be transmitted to an auxiliary endpoint device 140 instead of the first endpoint device 140. The auxiliary endpoint device 140 may be an endpoint device 140, other than the first endpoint device 140 (e.g., the endpoint device 140 which was used to receive the first authentication credential), determined by the system 130 to be associated with the user identifier of the first authentication credential. The system 130 may have numerous logs or records of authenticated authorization requests associated with the user identifier. Further, the user associated with the user identifier may have previously provided details to the entity (and thereby, the system 130) of auxiliary endpoint device(s) 140 through which they prefer to receive requests for second authentication credentials. For example, the user associated with a particular user identifier may indicate that a laptop and a smartphone are their two preferred endpoint devices 140 for receiving requests for second authentication credentials. Assuming that the user in this example provided the first authentication credential via the laptop, the enhanced authentication engine would send a request for a second authentication credential to the smartphone (through an API, HTML webpage, SMS, etc).

Accordingly, the enhanced authentication engine may receive, via a second authentication transmission, the second authentication credential from the user on the user interface of the first endpoint device 140 or an auxiliary endpoint device 140. The second authentication credential may be input to a user interface of the second user device or of a user interface of the auxiliary endpoint device 140. Thereafter, the second user device or the auxiliary endpoint device 140 may transmit the authentication credential to the enhanced authentication engine via a second authentication transmission.

Utilizing the same processes for authorizing the authorization request of the first authentication credential, the second authentication credential is compared to an expected second authentication credential of a storage device 106 of the system 130. If the second authentication credential is accepted, the system 130 authorizes the authorization request as illustrated in block 412A. If the second authentication credential is rejected (e.g., no match between the second authentication credential and the expected second authentication credential) the authorization request may be denied, as illustrated in 412B. Any further authorization requests from the same user identifier may be prohibited as a result of both the first and second authentication requests being denied. In the event that the second authorization request is denied, details such as the IP address, MAC address, user identifier, geographic location (provided from the geolocation module of first endpoint device 140 and/or the auxiliary endpoint device 140), may be transmitted to the identity database and/or the machine learning model (e.g., the trained machine learning model 232) such as to alert to existence of, and/or prevent, future authorization requests from the same IP address, MAC address, user identifier, and/or geographic location.

In some embodiments, the denial of the second authorization request may prompt the alert engine to transmit an alert to an authorization device, the alert comprising details of the IP address, MAC address, user identifier, and/or geographic location.

FIG. 5 illustrates a process flow 500 for an alert engine, in accordance with an embodiment of the invention. As previously illustrated with respect to FIG. 4, the alert engine of the enhanced authorization engine may be implemented (i) after an anomaly has been detected by the machine learning engine, and/or (ii) after a first and/or second authorization request has been denied as a result of the first and/or second authentication credential mismatching with the corresponding expected first and/or second authentication credential(s). The alert engine will now be described in detail with respect to the specific functionality of the alert engine, as well as the receiving of threat indicators therein for storage in the identity database.

As illustrated in block 502, the alert engine transmits an alert to the authorization device. In some embodiments, the alert may be a graphical window or pop-up on the user interface of the authorization device. In some embodiments, the alert may be populated into a spreadsheet or matrix of the interface portion of the alert engine, such that a user may be presented with visual indication of the alert. Further, such spreadsheets or matrix portions of the alert engine may be searchable and/or sortable as described previously. If the alert is related to an anomaly in the combined data, then the alert may include text with such anomaly details (e.g., details of the anomaly). For example, details including text of the specific IP address(es), IP address, MAC address, user identifier, and/or geographic location of the anomaly as determined by the machine learning engine. In some embodiments, if the alert is related to a first and/or second authorization request has been denied as a result of the first and/or second authentication credential mismatching with the corresponding expected first and/or second authentication credential(s), the alert may contain text of the specific IP address(es), IP address, MAC address, user identifier, and/or geographic location of the first endpoint device 140.

As illustrated in block 504, the alert engine may then display the alert on a user interface of the authorization device. The alert may also include any number of sounds, buzzers, automatic e-mail transmissions containing alert details (wherein the alert details include the anomaly details), text messages containing alert details and/or phone calls containing alert details, or the like.

In some embodiments, the alert may include one or more inputs, the one or more inputs configured as interactive buttons, radio buttons, text boxes, drop-down menus, or the like, for a user associated with the entity (e.g., supervising user) to provide details and/or a disposition to the alert and therefore details and/or a disposition to the underlying anomaly or first endpoint device 140. In this way, the details and/or disposition may be received (i) by the machine learning model as training data to facilitate better threat detection in future authorization requests, and/or (ii) by the identity database to store the details, disposition, and/or threat indicator (as will be discussed in more detail hereinafter).

Once an alert is received on the authorization device(s), a user associated with the entity (e.g., supervising user) may wish to positively identify, manually by the input, the underlying anomaly and/or first endpoint device 140 as an attempt to misappropriate the network by a malfeasant actor. Accordingly, the alert engine may receive via the input, from a user associated with the entity (e.g., supervising user), a new threat indicator (e.g., a threat indicator for the underlying authorization request of the instant alert) as illustrated in block 506. As previously described, threat indicators are parameters set forth by users associated with the entity to identify authorization requests that may be perpetuated by malfeasant actors. The new threat indicator may include the malicious domain, IP address(es), MAC address(es), and/or physical location(s), threat type(s) as described by the user, date(s) of validity of the threat indicator as described by a user, and/or threat type(s) as described by a user (e.g., types of attribution, level of attribution), and so forth associated with the authorization request. Such threat indicators may be manually input by a user into a graphical user interface of an endpoint device 140.

As illustrated in block 508, the alert engine thereafter may store the new threat indicator in the identity database. In this way a "closed-loop" feedback system is created, such that future authorization requests are subjected to the machine learning model which constantly receives up-to-date combined data as training data. In other words, the newly applied threat indicator(s) are training data the machine learning model 224 or trained machine learning model 232 may be configured to receive threat indicators as training data 218 in order to become a trained machine learning model 232 or enhance the accuracy of trend or pattern recognition. Accordingly, the machine learning model may continuously receive these threat indicators as provided by users associated with the entity, and use these threat indicators as training data to recognize patterns in the combined data of future authorization requests.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device 106. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for electronic authentication of electronic distributed network traffic via enriched data, the system comprising:
   at least one non-transitory storage device; and
   at least one processing device coupled to the at least one non-transitory storage device,
      wherein the at least one processing device is configured to:

receive an authorization request from a user of a first endpoint device to send or receive data with a second endpoint device;

transmit a request for a first authentication credential to the first endpoint device;

receive, via an authentication transmission, the first authentication credential from the user on a user interface of the first endpoint device;

initialize an enhanced authentication engine by transmitting attributes of the authentication transmission to the enhanced authentication engine, wherein the enhanced authentication engine comprises a machine learning model and a middleware component, the middleware component for assembling multiple data sources in real-time, and wherein the enhanced authentication engine is configured to:

collect, by the middleware component, a second data flow to the enhanced authentication engine, the second data flow relating to network traffic passing to the enhanced authentication engine and comprising at least one geolocation as a known threat indicator;

combine into a combined data, by the middleware component, a metadata source with the second data flow;

initiate the machine learning model, wherein the machine learning model is configured to at least one of: (i) receive threat indicators as training data, and (ii) recognize patterns in the combined data;

determine, via the machine learning model, anomalies in the combined data;

transmit the combined data to an alert engine, wherein the alert engine is configured to transmit an alert to an authorization device if there is an anomaly in the combined data as determined by the machine learning model;

authorize the authorization request if there is no anomaly in the combined data;

transmit a request for a second authentication credential to an auxiliary endpoint device if there is an anomaly in the combined data determined by the machine learning model;

receive, via a second authentication transmission, the second authentication credential from the user on the user interface of the auxiliary endpoint device; and authorize the authorization request if the second authentication credential is accepted.

2. The system of claim 1, wherein the enhanced authentication engine is further configured to:

transmit the alert to the authorization device, the alert comprising details of the anomaly; and display the alert on a user interface of the authorization device.

3. The system of claim 1, wherein the first endpoint device comprises a geolocation module and a forwarding engine operatively coupled to the middleware component.

4. The system of claim 1, wherein the metadata source comprises geolocation data of the first endpoint device.

5. The system of claim 2, wherein the alert comprises an input, the input configured to:

receive a new threat indicator from a supervising user; and store the new threat indicator in an identity database.

6. A computer program product for electronic authentication of electronic distributed network traffic via enriched data, the computer program product comprising a non-transitory computer-readable medium comprising code causing a first apparatus to:

receive an authorization request from a user of a first endpoint device to send or receive data with a second endpoint device;

transmit a request for a first authentication credential to the first endpoint device;

receive, via an authentication transmission, the first authentication credential from the user on a user interface of the first endpoint device;

initialize an enhanced authentication engine by transmitting attributes of the authentication transmission to the enhanced authentication engine, wherein the enhanced authentication engine comprises a machine learning model and a middleware component, the middleware component for assembling multiple data sources in real-time, and wherein the enhanced authentication engine is configured to:

collect, by the middleware component, a second data flow to the enhanced authentication engine, the second data flow relating to network traffic passing to the enhanced authentication engine and comprising at least one geolocation as a known threat indicator;

combine into a combined data, by the middleware component, a metadata source with the second data flow;

initiate the machine learning model, wherein the machine learning model is configured to at least one of: (i) receive threat indicators as training data, and (ii) recognize patterns in the combined data;

determine, via the machine learning model, anomalies in the combined data;

transmit the combined data to an alert engine, wherein the alert engine is configured to transmit an alert to an authorization device if there is an anomaly in the combined data as determined by the machine learning model;

authorize the authorization request if there is no anomaly in the combined data;

transmit a request for a second authentication credential to an auxiliary endpoint device if there is an anomaly in the combined data determined by the machine learning model;

receive, via a second authentication transmission, the second authentication credential from the user on the user interface of the auxiliary endpoint device; and authorize the authorization request if the second authentication credential is accepted.

7. The computer program product of claim 6, wherein the enhanced authentication engine is further configured to:

transmit the alert to the authorization device, the alert comprising details of the anomaly; and display the alert on a user interface of the authorization device.

8. The computer program product of claim 6, wherein the first endpoint device comprises a geolocation module and a forwarding engine operatively coupled to the middleware component.

9. The computer program product of claim 6, wherein the metadata source comprises geolocation data of the first endpoint device.

10. The computer program product of claim 7, wherein the alert comprises an input, the input configured to:

receive a new threat indicator from a supervising user; and store the new threat indicator in an identity database.

11. A method for electronic authentication of electronic distributed network traffic via enriched data, the method comprising:
- receiving an authorization request from a user of a first endpoint device to send or receive data with a second endpoint device;
- transmitting a request for a first authentication credential to the first endpoint device;
- receiving, via an authentication transmission, the first authentication credential from the user on a user interface of the first endpoint device;
- initializing an enhanced authentication engine by transmitting attributes of the authentication transmission to the enhanced authentication engine, wherein the enhanced authentication engine comprises a machine learning model and a middleware component, the middleware component for assembling multiple data sources in real-time, and wherein the enhanced authentication engine is configured to:
  - collect, by the middleware component, a second data flow to the enhanced authentication engine, the second data flow relating to network traffic passing to the enhanced authentication engine and comprising at least one geolocation as a known threat indicator;
  - combine into a combined data, by the middleware component, a metadata source with the second data flow;
  - initiate the machine learning model, wherein the machine learning model is configured to at least one of: (i) receive threat indicators as training data, and (ii) recognize patterns in the combined data;
  - determine, via the machine learning model, anomalies in the combined data;
  - transmit the combined data to an alert engine, wherein the alert engine is configured to transmit an alert to an authorization device if there is an anomaly in the combined data as determined by the machine learning model;
  - authorize the authorization request if there is no anomaly in the combined data;
  - transmit a request for a second authentication credential to an auxiliary endpoint device if there is an anomaly in the combined data determined by the machine learning model;
  - receive, via a second authentication transmission, the second authentication credential from the user on the user interface of the auxiliary endpoint device; and
  - authorize the authorization request if the second authentication credential is accepted.

12. The method of claim 11, wherein the enhanced authentication engine further configured to:
- transmit the alert to the authorization device, the alert comprising details of the anomaly; and
- display the alert on a user interface of the authorization device.

13. The method of claim 11, wherein the first endpoint device comprises a geolocation module and a forwarding engine operatively coupled to the middleware component.

14. The method of claim 11, wherein the metadata source comprises geolocation data of the first endpoint device.

15. The method of claim 11, wherein the alert comprises an input, the input configured to:
- receive a new threat indicator from a supervising user; and
- store the new threat indicator in an identity database.

* * * * *